United States Patent [19]
Itou et al.

[11] Patent Number: 5,677,838
[45] Date of Patent: Oct. 14, 1997

[54] FAULTY OPERATION PREVENTION CIRCUIT OF A COMPUTER

[75] Inventors: Keiji Itou, Hoi-gun; Kiyotaka Sugiura, Nagoya; Toshihisa Nakano, Okazaki; Masaki Itou, Kariya; Takashi Noguchi, Chiryu, all of Japan

[73] Assignee: Nippondenso Co., Ltd., Kariya, Japan

[21] Appl. No.: 419,533

[22] Filed: Apr. 10, 1995

[30] Foreign Application Priority Data

Apr. 28, 1994 [JP] Japan .................. 6-091903

[51] Int. Cl.⁶ .................. G06F 11/14; B60R 21/32
[52] U.S. Cl. .................. 364/424.034; 364/424.039; 364/424.055; 280/735; 180/271; 340/438
[58] Field of Search .................. 364/424.05, 426.04, 364/424.03, 424.034, 424.035, 424.036, 424.039, 424.055; 340/436, 438; 280/735, 802; 180/268, 270, 271, 272, 282; 307/10.1, 121

[56] References Cited

U.S. PATENT DOCUMENTS

| | | | |
|---|---|---|---|
| 4,222,030 | 9/1980 | Yasui et al. | 180/274 |
| 4,287,431 | 9/1981 | Yasui et al. | 307/10.1 |
| 4,868,817 | 9/1989 | Shigihara | 395/184.01 |
| 4,950,914 | 8/1990 | Kurihara et al. | 307/10.1 |
| 5,038,134 | 8/1991 | Kondo et al. | 340/438 |
| 5,045,835 | 9/1991 | Massegi et al. | 364/424.05 |
| 5,083,276 | 1/1992 | Okano et al. | 364/424.05 |
| 5,182,459 | 1/1993 | Okano et al. | 307/10.1 |
| 5,331,211 | 7/1994 | Kondo et al. | 307/10.1 |
| 5,351,185 | 9/1994 | Takeuchi et al. | 364/184 |

FOREIGN PATENT DOCUMENTS

| | | |
|---|---|---|
| 3-73091 | 7/1991 | Japan . |
| 3238359 | 10/1991 | Japan . |
| 5143196 | 6/1993 | Japan . |
| 5-76909 | 10/1993 | Japan . |

*Primary Examiner*—Kevin J. Teska
*Assistant Examiner*—Tan Nguyen
*Attorney, Agent, or Firm*—Cushman, Darby & Cushman IP Group of Pillsbury Madison & Sutro LLP

[57] ABSTRACT

A computer (CPU) applied a faulty operation prevention circuit outputs a pulse signal having a predetermined period during normal operation. If the computer does not output the pulse signal during the predetermined period, a AND gate in the faulty operation prevention circuit shuts off a control signal output from the computer which can ignite a squib in a vehicular occupant protecting system because the computer is not working. The AND gate keeps shutting off the control signal until the computer outputs the pulse signal. Therefore, the faulty operation prevention circuit prevents the squib from being ignited based on a faulty operation of the computer.

19 Claims, 2 Drawing Sheets

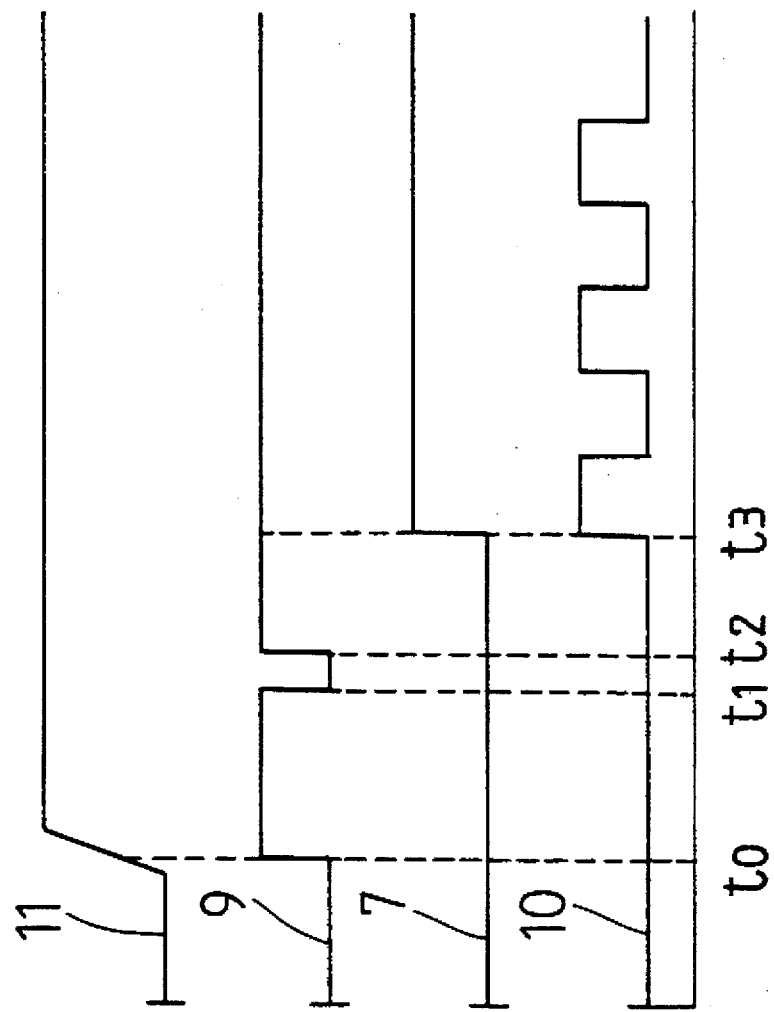

FAULTY OPERATION PREVENTION CIRCUIT OF A COMPUTER

CROSS REFERENCE TO RELATED APPLICATION

This application is based upon and claims priority from Japanese Patent Application No. Hei 6-91903 filed Apr. 28, 1994, the contents of which are incorporated herein by reference.

BACKGROUND OF THE INVENTION

1. Field of the Invention

The present invention relates to a faulty operation prevention circuit for a computer which is used, e.g., for a vehicular occupant protecting system.

2. Related Art

An example of a conventional faulty operation prevention circuit for a computer is disclosed in Japanese Unexamined Patent Publication No. Hei 5-143196. This conventional circuit includes a main CPU which outputs an igniting signal to a squib of an airbag system and a sub-CPU which monitors the operation of the main CPU. When the sub-CPU detects a faulty operation of the main CPU, the sub-CPU outputs a faulty operation detecting signal. The conventional circuit further includes an inhibitor, which prevents the igniting signal from being output to the squib in response to the faulty operation detecting signal. In this manner, the conventional circuit prevents the squib from being ignited unintentionally during the faulty operation of the main CPU.

The main CPU and the sub-CPU are reset to their initial states by a reset circuit. The reset circuit outputs reset signals to the main CPU and the sub-CPU when an ignition switch is turned on. However, it takes a little time until the main CPU and the sub-CPU start to work correctly after being reset by the reset signals. A signal output from the main CPU is unreliable before starting to work correctly. It is necessary to prevent the squib from being ignited based on the unreliable signal from the main CPU. Therefore, in the conventional circuit, a delay circuit is provided. The delay circuit outputs a starting signal to the inhibitor after a predetermined time has elapsed after the reset signals are input to the main CPU and the sub-CPU. The starting signal enables the inhibitor to output the igniting signal to the squib.

However, the time which the main CPU requires for starting to work correctly after being reset in response to the reset signal is not constant. Therefore, in the conventional circuit, the main CPU may not work correctly even after the inhibitor becomes active responsive to the starting signal.

SUMMARY OF THE INVENTION

It is an object of the present invention to provide a faulty operation prevention circuit for a computer-based system which can prevent the system from performing an incorrect control operation based on a signal output from a computer while the computer (such as the main CPU described above) does not work correctly.

The above object is attained by employing a computer which outputs a specified signal during a normal operation, and by stopping control performed by the computer until the computer outputs the specified signal after a reset signal is input thereto.

The reset signal is preferably input to the computer when electric power begins to be supplied to the computer because an operation of the computer is uncertain when power is first supplied. In addition, the reset signal can be input to the computer when the voltage of the electric power drops below a predetermined level. The predetermined level is determined based on a minimum voltage which enables the computer to work correctly.

The faulty operation prevention circuit for a computer according to the present invention can applied to a vehicular occupant protecting system. In that application, the reliability of the vehicular occupant protecting system is improved.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

FIGS. 2(a) through 2(d) are timing charts illustrating signals in the circuit of FIG. 1.

DETAILED DESCRIPTION OF THE PREFERRED EMBODIMENTS

Figure 1:
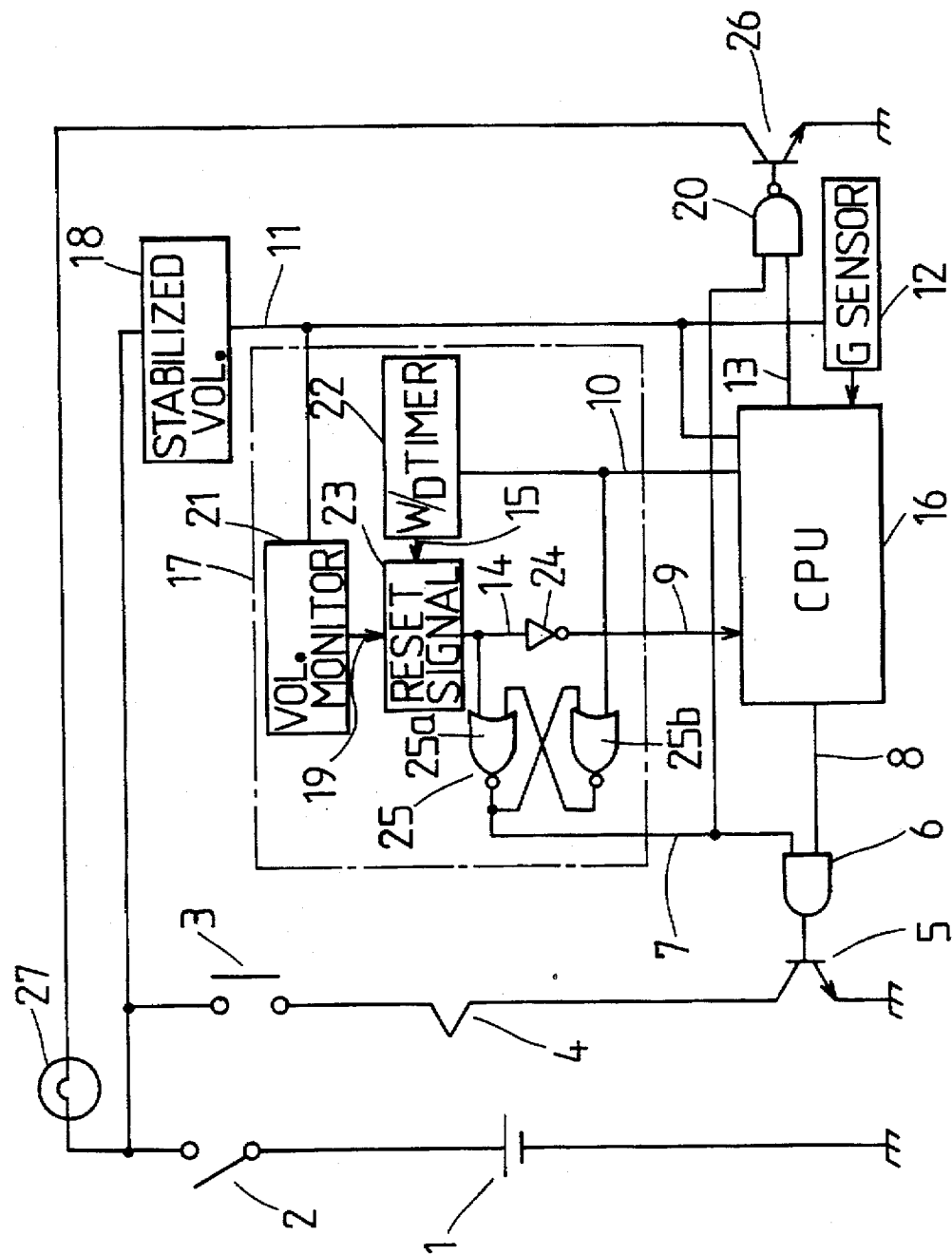
FIG. 1 is a circuit diagram of the embodiment according to the present invention.

The preferred embodiments of the present invention will be described in detail with reference to the attached figures.

FIG. 1 is circuit diagram of a faulty operation prevention circuit for a computer according to the present invention which is used in a vehicular occupant protecting system. In the circuit illustrated in FIG. 1, reference numeral 1 indicates a battery as a power source, and reference numeral 2 indicates an ignition switch of a vehicle. Reference numeral 3 indicates a switch whose contacts close when deceleration of the vehicle is greater than a predetermined level. Reference numeral 4 indicates a squib which energizes an inflator (not shown) to inflate an airbag (not shown) and reference numeral 5 indicates a transistor which selectively allows an ignition current to flow to the squib 4. Reference numeral 18 indicates a stabilized power source which generates a constant or stabilized voltage 11 from a voltage supplied by battery 1 and which supplies the stabilized voltage 11 to acceleration (G) sensor 12, CPU 16 and CPU monitor 17.

G sensor 12 detects an actual acceleration of the vehicle and outputs an acceleration signal. CPU 16 determines, according to a stored program and based on the acceleration signal, whether the vehicle has collided with some obstruction. CPU 16 outputs collision signal 8 to AND gate 6 if CPU 16 determines that a vehicle collision has occurred. CPU 16 also outputs clock pulse signal 10 having a predetermined period when CPU 16 can perform normal control operations according to the stored program.

CPU monitor 17 includes voltage monitor 21, watchdog (W/D) timer 22, reset signal forming circuit 23, inverter 24 and flip-flop circuit 25. Voltage monitor 21 monitors whether the stabilized voltage 11 which is supplied to CPU 16 by stabilized power source 18 is lower than a predetermined voltage, and outputs low voltage indicating signal 19 to reset signal forming circuit 23 when the stabilized voltage 11 is lower than the predetermined voltage. The predetermined voltage is determined based on a minimum voltage which enables the computer to work correctly. An example of the minimum voltage is 4–5V.

Clock pulse signal 10 output from CPU 16 is input to watchdog timer 22. Watchdog timer 22 is reset every time the clock pulse signal 10 changes from a low level to a high level. Watchdog timer 22 has a predetermined period.

Because of, for instance, faulty operation of CPU 16, if the clock pulse signal 10 does not change from a low level to a high level during the predetermined period, watchdog timer 22 outputs watchdog signal 15 to reset signal forming circuit 23.

If reset signal forming circuit 23 receives at least one of low voltage indicating signal 19 and watchdog signal 15, it outputs reset signal (active high signal) 14. Reset signal 14 changes from a high level to a low level when both low voltage indicating signal 19 and watchdog signal 15 stop being input to reset signal forming circuit 23. Inverter 24 inverts reset signal 14 and outputs it as inverted reset signal 9. Inverted reset signal 9 is input to CPU 16.

Flip-flop circuit 25 includes first NOR gate 25a and second NOR gate 25b, and reset signal 14 is input to first NOR gate 25a and clock pulse signal 10 is input to second NOR gate 25b. Flip-flop circuit 25 outputs CPU monitor signal 7 which indicates whether CPU 16 has output clock pulse signal 10.

CPU monitor signal 7 and lamp lighting signal 13 are input to NAND gate 20. Lamp lighting signal 13 is an active low signal and is output from CPU 16 when CPU 16 detects some abnormality of circuit parts such as squib 4. Transistor 26 is turned on by an output signal from NAND gate 20. Lamp 27 lights up when transistor 26 is turned on, and notifies passengers that some abnormality has occurred in the circuit. That is, Lamp 27 functions as a Warning Device.

The operation of the embodiment explained above will be explained using FIGS. 2(a) through 2(d).

FIG. 2(a) indicates a change in stabilized voltage 11 generated by stabilized power source 18; FIG. 2(b) indicates changes in inverted reset signal 9 from inverter 24; FIG. 2(c) indicates a change in CPU monitor signal 7; and FIG. 2(d) indicates changes in clock pulse signal 10.

When ignition switch 2 is turned on, battery 1 supplies voltage to stabilized power source 18. Stabilized power source 18 supplies stabilized voltage 11 to G sensor 12, CPU 16 and voltage monitor 21, and G sensor 12, CPU 16 and voltage monitor 21 become operational. Stabilized voltage 11 supplied to CPU 16 starts to change from a low level to a high level when ignition switch 2 is turned on, as illustrated in FIG. 2(a). Voltage monitor 21 outputs low voltage indicating signal 19 to reset signal forming circuit 23 because stabilized voltage 11 is lower than the predetermined voltage before time t0. Reset signal forming circuit 23 outputs reset signal 14 (active high signal) and inverted reset signal 9 (active low signal) output by inverter 24 is input to CPU 16. Inverted reset signal 9 is shown in FIG. 2(b). Also, reset signal 14 is input to first NOR gate 25a of flip-flop circuit 25, so that flip-flop circuit 25 outputs a low level CPU monitor signal 7 as shown in FIG. 2(c).

Before time t0, CPU 16 does not work correctly because stabilized voltage 11 supplied to CPU 16 is too low. Therefore, clock pulse signal 10 output by CPU 16 has a constant low level as shown in FIG. 2(d). Clock pulse signal 10 which has a low level is input to second NOR gate 25b. However, CPU monitor signal 7 which is the output signal of flip-flop circuit 25 is unchanged and stays at a low level. CPU monitor signal 7 is input to NAND gate 20. NAND gate 20 outputs a high level signal due to the low level of CPU monitor signal 7, so that transistor 26 is turned on. Because lamp 27 lights up when transistor 26 is turned on, passengers recognize that CPU 16 does not work correctly.

After time has elapsed since stabilized power source 18 started to supply stabilized voltage 11 and the elapsed time reaches time t0, low voltage indicating signal 19 output from voltage monitor 21 disappears because stabilized voltage 11 becomes higher than the predetermined voltage. Reset signal 14 output from reset signal forming circuit 23 changes from a high level to a low level, and inverted reset signal 9 changes from a low level to a high level at time t0.

From time t0 on, low level reset signal 14 is input to first NOR gate 25a. However, because an output signal of first NOR gate 25a had a low level before time t0 and clock pulse signal 10 also has a low level, an output signal of second NOR gate 25b is unchanged and remains at a high level. The high level output signal of second NOR gate 25b is input to first NOR gate 25a, so that an output signal of first NOR gate 25, namely CPU monitor signal 7 is maintained at a low level.

If CPU 16 does not work correctly and clock pulse signal 10 stays at a low level when the time elapsing after time t0 becomes longer than the predetermined period of watchdog timer 22 and reaches time t1, watchdog signal 15 is output to reset signal forming circuit 23 from watchdog timer 22. Reset signal forming circuit 23 outputs high level reset signal 14 in response to watchdog signal 15. Inverted reset signal 9 changes from a high level to a low level at time t1. However, CPU monitor signal 7 and clock pulse signal 10 are unchanged and stay at a low level as shown in FIGS. 2(c) and 2(d).

After watchdog signal 15 is output from watchdog timer 22 for a predetermined time, watchdog signal 15 is terminated at time t2. Due to such a change in watchdog signal 15, reset signal 14 changes from a high level to a low level and inverted reset signal 9 changes from a low level to a high level at time t2. After that, watchdog timer 22 begins to count the predetermined period again. If clock pulse signal 10 does not change to a high level during the predetermined period, watchdog timer 22 outputs watchdog signal 15 to reset signal forming circuit 23 and reset signal forming circuit 23 outputs reset signal 14 just as described above.

On the other hand, if CPU 16 begins to work correctly, for instance, at time t3, so that clock pulse signal 10 changes to a high level during the predetermined period, high level clock pulse signal 10 is input to second NOR gate 25b. Second NOR gate 25b outputs a low level signal, which is input to first NOR gate 25a. At time t3, reset signal 14 stays at a low level and thereby CPU monitor signal 7 output from flip-flop circuit 25 changes to a high level. This high level CPU monitor signal 7 is input to AND gate 6. If the deceleration of the vehicle is higher than a predetermined level, the contacts of switch 3 close and CPU 16 outputs collision signal 8 to AND gate 6. AND gate 6 outputs a high level signal to the base of transistor 5 responsive to collision signal 8 so that transistor 5 is turned on. Therefore, igniting current flows through squib 4 and the airbag is inflated based on the igniting current.

In the embodiment described above, while CPU 16 does not work correctly before time t3, CPU monitor signal 7 stays at a low level. This low level CPU monitor signal 7 is input to AND gate 6 so that AND gate 6 outputs a low level signal unconditionally. The low level signal keeps transistor 5 turned off. Therefore, even if CPU 16 outputs collision signal 8 accidentally, it is possible to prevent the airbag from inflating based on such an accidental signal.

In addition, voltage monitor 21 determines whether stabilized voltage 11 which is supplied to CPU 16 is lower than the predetermined voltage. If so, CPU 16 might not work normally, so reset signal 14 is output from reset signal forming circuit 23. Reset signal 14 enables transistor 5 to be set to an inactive state. Therefore, even if CPU 16 outputs collision signal 8 accidentally due to the voltage drop, it is possible to prevent the airbag from inflating based on such an accidental signal.

What is claimed is:

1. A faulty operation prevention circuit comprising:
   a computer for providing a control signal to a system according to a stored program and outputting, in normal operation, a specified signal which is different from said control signal;
   a reset signal supplying circuit for supplying a reset signal to said computer to cause said computer to enter a reset state; and
   a control stopping circuit connected between said computer and said system, which receives both said specified signal from said computer and said reset signal from said reset signal supplying circuit, said control stopping circuit stopping provision of said control signal to said system when said reset signal is input thereto and resuming provision of said control signal to said system when said specified signal following said reset signal is input thereto.

2. The faulty operation prevention circuit as claimed in claim 1, wherein said reset signal supplying circuit supplies said reset signal to said computer when operative power begins to be supplied to said computer to cause said computer to enter said reset state at power-up.

3. The faulty operation prevention circuit as claimed in claim 1, wherein said reset signal supplying circuit supplies said reset signal to said computer when operative power supplied to said computer drops below a predetermined voltage to cause said computer to enter said reset state at power-up.

4. The faulty operation prevention circuit as claimed in claim 1, wherein said specified signal is a pulse signal having a preset period and said reset signal supplying circuit supplies said reset signal to said computer when said computer does not output said pulse signal in said preset period.

5. The faulty operation prevention circuit as claimed in claim 1, wherein said control stopping circuit includes means for shutting off a control signal output from said computer to said system.

6. The faulty operation prevention circuit as claimed in claim 5, wherein said means for shutting off a control signal includes:
   a flip-flop circuit which changes output state in response to said reset signal and said specified signal; and
   a gate circuit which allows or prohibits passage of said control signal in response to said output state of said flip-flop circuit.

7. The faulty operation prevention circuit as claimed in claim 1, wherein said reset signal supplying circuit supplies said reset signal to said computer when operative power begins to be supplied to said computer to cause said computer to enter said reset state at power-up or when said operative power drops below a predetermined voltage.

8. The faulty operation prevention circuit according to claim 1, wherein said control stopping circuit comprises:
   a flip-flop circuit which changes output state in response to said reset signal and said specified signal; and
   a gate circuit which allows or prohibits passage of said control signal in response to said output state of said flip-flop circuit.

9. A faulty operation prevention circuit for use in a vehicular occupant protecting system, said circuit comprising:
   a computer for outputting a control signal for the vehicular occupant protecting system according to a stored program and, in normal operation, outputting a pulse signal having a preset period, said pulse signal being different from said control signal;
   a reset signal supplying circuit for supplying a reset signal to said computer to cause said computer to enter a reset state; and
   a control signal shutting off circuit connected between said computer and said vehicular occupant protecting system, which receives both said pulse signal from said computer and said reset signal from said reset signal supplying circuit, said control signal shutting off circuit shutting off said control signal to said vehicular occupant system when said reset signal is input thereto and resuming provision of said control signal to said vehicular occupant system when said pulse signal following said reset signal is input thereto.

10. The faulty operation prevention circuit as claimed in claim 9, wherein said reset signal supplying circuit supplies said reset signal to said computer when operative power begins to be supplied to said computer to cause said computer to enter said reset state at power-up or when said operative power drops below a predetermined voltage.

11. The faulty operation prevention circuit according to claim 9, wherein said control signal shutting off circuit comprises:
    a flip-flop circuit which changes output state in response to said reset signal and said pulse signal; and
    a gate circuit which allows or prohibits passage of said control signal in response to said output state of said flip-flop circuit.

12. A faulty operation prevention circuit for an airbag actuation system, said faulty operation prevention circuit comprising:
    a computer for outputting a control signal to perform control of an airbag ignition circuit according to a stored program and, in normal operation, outputting a specified signal which is different from said control signal, and for providing an actuation signal to said ignition circuit to actuate an airbag;
    a reset signal supplying circuit for supplying a reset signal to said computer to cause said computer to enter a reset state; and
    a control stopping circuit connected between said computer and said airbag ignition system, which receives both said specified signal from said computer and said reset signal from said reset signal supplying circuit, said control stopping circuit preventing said actuation signal from being provided to said ignition circuit when said reset signal is input thereto and resuming provision of said actuation signal to said ignition circuit when said specified signal following said reset signal is input thereto.

13. The faulty operation prevention circuit for an airbag actuation system as claimed in claim 12, wherein said reset signal supplying circuit supplies said reset signal to said computer when operative power begins to be supplied to said computer to cause said computer to enter said reset state at power-up.

14. The faulty operation prevention circuit for an airbag actuation system as claimed in claim 12, wherein said reset signal supplying circuit supplies said reset signal to said computer when operative power supplied to said computer drops below a predetermined voltage to cause said computer to enter said reset state at power-up.

15. The faulty operation prevention circuit for an airbag actuation system as claimed in claim 12, wherein said specified signal is a pulse signal having a preset period and said reset signal supplying circuit supplies said reset signal to said computer when said computer does not output said pulse signal in said preset period.

16. The faulty operation prevention circuit for an airbag actuation system as claimed in claim 12, wherein said control stopping circuit includes means for shutting off said actuation signal output from said computer to said airbag actuation system.

17. The faulty operation prevention circuit as claimed in claim 16, wherein said means for shutting off said actuation signal includes:

a flip-flop circuit which changes output state in response to said reset signal and said specified signal; and a gate circuit which allows or prohibits passage of said actuation signal in response to said output state of said flip-flop circuit.

18. The faulty operation prevention circuit as claims in claim 12, wherein said reset signal supplying circuit supplies said reset signal to said computer when operative power begins to be supplied to said computer to cause said computer to enter said reset state at power-up or when said operative power drops below a predetermined voltage.

19. The faulty operation prevention circuit according to claim 12, wherein said control stopping circuit comprises:

a flip-flop circuit which changes output state in response to said reset signal and said specified signal; and a gate circuit which allows or prohibits passage of said actuation signal in response to said output state of said flip-flop circuit.

* * * * *